US008579231B2

(12) United States Patent
Machado et al.

(10) Patent No.: US 8,579,231 B2
(45) Date of Patent: Nov. 12, 2013

(54) METHOD OF MANUFACTURE BY SUPERPLASTIC FORMING AND BY FISHPLATING OF A RIB FOR AN AERODYNAMIC FAIRING OF AN AIRCRAFT ENGINE MOUNTING PYLON

(75) Inventors: Stephane Machado, Verdun sur Garonne (FR); Fabien Raison, Plaisance du Touch (FR); Stephane Romani, Toulouse (FR)

(73) Assignee: AIRBUS Operations S.A.S., Toulouse (FR)

( * ) Notice: Subject to any disclaimer, the term of this patent is extended or adjusted under 35 U.S.C. 154(b) by 218 days.

(21) Appl. No.: 13/115,331

(22) Filed: May 25, 2011

(65) Prior Publication Data
US 2011/0290935 A1 Dec. 1, 2011

(30) Foreign Application Priority Data
May 27, 2010 (FR) ..................................... 10 54065

(51) Int. Cl.
*B64D 27/00* (2006.01)
(52) U.S. Cl.
USPC ........................................... 244/54; 244/131
(58) Field of Classification Search
USPC ............ 248/554–557; 244/54, 53 R, 53, 130, 244/131
See application file for complete search history.

(56) References Cited

U.S. PATENT DOCUMENTS

| 4,304,821 | A  | * | 12/1981 | Hayase et al. | ................. 428/593 |
| 5,692,881 | A  | * | 12/1997 | Leibfried | ....................... 416/233 |
| 2003/0201366 | A1 | * | 10/2003 | Connelly et al. | .............. 244/121 |
| 2007/0102494 | A1 |  | 5/2007 | Connelly et al. | |
| 2010/0051743 | A1 |  | 3/2010 | Dumont et al. | |

FOREIGN PATENT DOCUMENTS

| DE | 10 2008 014 103 A1 | 9/2009 |
| WO | WO 2007/058906 A1 | 5/2007 |
| WO | WO 2008/113737 A1 | 9/2008 |
| WO | WO 2009/037267 A1 | 3/2009 |

OTHER PUBLICATIONS

U.S. Appl. No. 13/115,408, filed May 25, 2011, Machado, et al.
Preliminary Search Report issued Jan. 28, 2011 in France Application No. 1054065 (With English Translation of Categories of Cited Documents).

* cited by examiner

*Primary Examiner* — Timothy D Collins
*Assistant Examiner* — Jamie S Stehle
(74) *Attorney, Agent, or Firm* — Oblon, Spivak, McClelland, Maier & Neustadt, L.L.P.

(57) ABSTRACT

The present invention relates to a method of manufacture of a stiffening transverse internal rib (46) for an aerodynamic fairing of an engine mounting device, including:
- the production of a rib preform by superplastic forming having an outline of a broadly quadrilateral shape, and a central opening (52) traversing this preform;
- the division of the preform into two parallel straight-line segments (56, 60), which are diagonally opposed, causing the separation into two half-parts (46a', 46a") of the rib preform; and
- fishplating of the two rib preform half-parts (46a', 46a") by bolting.

15 Claims, 5 Drawing Sheets

METHOD OF MANUFACTURE BY SUPERPLASTIC FORMING AND BY FISHPLATING OF A RIB FOR AN AERODYNAMIC FAIRING OF AN AIRCRAFT ENGINE MOUNTING PYLON

TECHNICAL FIELD

The present invention relates to a lower aft aerodynamic fairing for an engine mounting device intended to be interposed between an aircraft wing surface and the engine concerned, this fairing also being called a "shield" or "APF" ("Aft Pylon Fairing").

Such a mounting device, also called an "EMS" ("Engine Mounting Structure"), allows, for example, a turbine engine to be suspended beneath the wing surface of the aircraft, or allows this turbine engine to be mounted above this same wing surface or, again, allows it to be mounted laterally in the aft part of the fuselage. An example of a mounting device is known from document WO 2009/037267.

More specifically, the invention relates to the transverse internal stiffener ribs which are fitted to the lower aft aerodynamic fairing, and more specifically to their method of manufacture.

The invention may be used in any type of aircraft fitted with turbojets or turboprop engines.

STATE OF THE PRIOR ART

A mounting device is, indeed, designed to constitute the connecting interface between a turbine engine and a wing surface of the aircraft. It enables the forces generated by its associated turbine engine to be transmitted to the structure of this aircraft, and also allows conveyance of the fuel, and passage of the electrical, hydraulic and air systems, between the engine and the aircraft.

To ensure the transmission of the forces the structure includes a rigid structure, also called the primary structure, often of the "box" type, i.e. formed by the assembly of upper and lower spars and of side panels connected one to the other through transverse stiffening ribs.

Secondly, the device is fitted with mounting means interposed between the turbine engine and the rigid structure, and these means include globally two engine attachments, and a device for transmission of the thrust forces generated by the turbine engine. In the prior art this transmission device habitually includes two lateral connecting rods connected firstly to an aft part of the fan casing of the turbine engine, and secondly to an aft attachment attached to the central casing of the engine.

Similarly, the mounting device also includes another series of attachments constituting a mounting system interposed between the rigid structure and the wing surface of the aircraft, and this system habitually consists of two or three attachments.

In addition, the pylon is fitted with multiple secondary structures allowing the systems to be segregated and held in position, whilst supporting aerodynamic fairing elements, and where the latter generally take the form of assemblies of panels added on to the structures. In a manner known to the skilled man in the art, the secondary structures are differentiated from the rigid structure in that they are not intended to transfer forces originating from the engine which must be transmitted to the wing surface of the aircraft.

The secondary structures include the lower aft aerodynamic fairing, also called APF, which has multiple functions, one of which is the formation of a thermal or anti-fire barrier, and the formation of aerodynamic continuity between the engine outlet and the mounting pylon.

The lower aft aerodynamic fairing generally takes the form of a box including two side panels joined to one another by transverse internal stiffening ribs spaced relative to one another in a lengthways direction of the fairing, and a thermal protection floor. It is stipulated that this box cannot be completely closed at the end opposite the thermal protection floor, i.e. in the upper part when the engine is intended to be suspended under the wing surface of the aircraft, given that it is in this location that it is connected to the other structures of the pylon.

The thermal protection floor is fitted with an outer surface intended to be followed by a primary flow of the engine which it demarcates, whereas the side panels are, for their part, designed to be followed externally by a secondary flow of the engine, due to their positioning in the annular channel of the engine's secondary flow, and/or at the engine's outlet.

The internal ribs are habitually made from a titanium alloy, TA6V, due to the excellent mechanical characteristics which it confers, and to its relatively low mass, notably in comparison with the mass of steel.

Machining is a first manufacturing technique for the rib. It has the advantage of giving precise tolerances, but does not enable thin ribs to be obtained. Indeed, below a certain rib thickness, for example of the order of 2 mm, the rib is no longer capable of supporting the machining stress.

Formation of such an internal rib by superplastic forming is also known. It has the advantage that it is not limited by any machining constraint, and is thus perfectly suited to obtaining thin ribs. Conversely, the ribs thus formed have imprecise tolerances.

ACCOUNT OF THE INVENTION

The purpose of the invention is therefore to provide at least partially a solution to the disadvantages mentioned above, compared with the embodiments of the prior art.

To accomplish this the purpose of the invention is a method of manufacture of a stiffening transverse internal rib for a lower aft aerodynamic fairing of an engine mounting device intended to be interposed between a wing surface of an aircraft and the said engine, where the said method includes the following successive steps:

production of a rib preform by superplastic forming, where the said preform has, seen from the front, an outline of a broadly quadrilateral shape, and a central opening traversing this rib preform;

division of the said rib preform into two parallel straight-line segments, a first straight-line segment connecting a first corner of the quadrilateral to the said opening, and a second straight-line segment connecting a second corner of the quadrilateral, diagonally opposed to the first, to the said opening, where the said division causes the separation into two half-parts of the said rib preform; and fishplating of the two rib preform half-parts by bolting, so as to obtain the said stiffening transverse internal rib.

The invention is essentially remarkable in that it enables a thin rib to be obtained through the use of the rib preform by superplastic forming, and enables it to be given precise tolerances by joining the two rib preform half-parts by fishplating.

The step of division is preferably undertaken in such a way that the two straight-line segments are supported by a given diagonal of the quadrilateral. An alternative embodiment clearly consists in making them parallel, but offset relative to one another, i.e. respectively supported by two separate parallel straight-line segments. In both cases, the adjustment of the relative positions of the two rib preform half-parts, before they are fishplated, enables precise dimensions to be obtained in both directions of the rib plane, namely height and width. To adjust them these half-parts are, for example, positioned in a simple and inexpensive positioning die, which is found widely in the industry.

The rib preform is preferably made such that it has, seen from the front, an outline with a broadly trapezoid shape. However, other quadrilateral shapes could be envisaged, such as for example a square or a rectangle.

The rib preform is preferably made from a titanium alloy TAV6.

Another purpose of the invention is a lower aft aerodynamic fairing for an engine mounting device intended to be interposed between a wing surface of an aircraft and the engine, where the fairing forms a box including two side panels connected to one another by stiffening transverse internal ribs spaced relative to another in a lengthways direction of the fairing, and also including a thermal protection floor having an outer surface intended to be followed by a primary engine flow.

According to the invention, one at least of the said stiffening transverse internal ribs is manufactured through the use of the method described above.

Another purpose of the invention is an engine mounting device intended to be interposed between a wing surface of an aircraft and the engine, where this device includes a lower aft aerodynamic fairing as described above.

In addition, another purpose of the invention is an engine assembly including an engine such as a turbojet and a device for mounting this engine in which this device is in keeping with the one which has just been mentioned.

Finally, another purpose of the present invention is an aircraft including at least one such engine assembly.

Other advantages and characteristics of the invention will appear in the non-restrictive detailed disclosure below.

BRIEF DESCRIPTION OF THE ILLUSTRATIONS

This description will be made with reference to the attached illustrations, among which FIG. 1 represents a schematic side view of an aircraft engine assembly, including a mounting device according to a preferred embodiment of the present invention;

DETAILED ACCOUNT OF PREFERRED EMBODIMENTS

Figure 1:
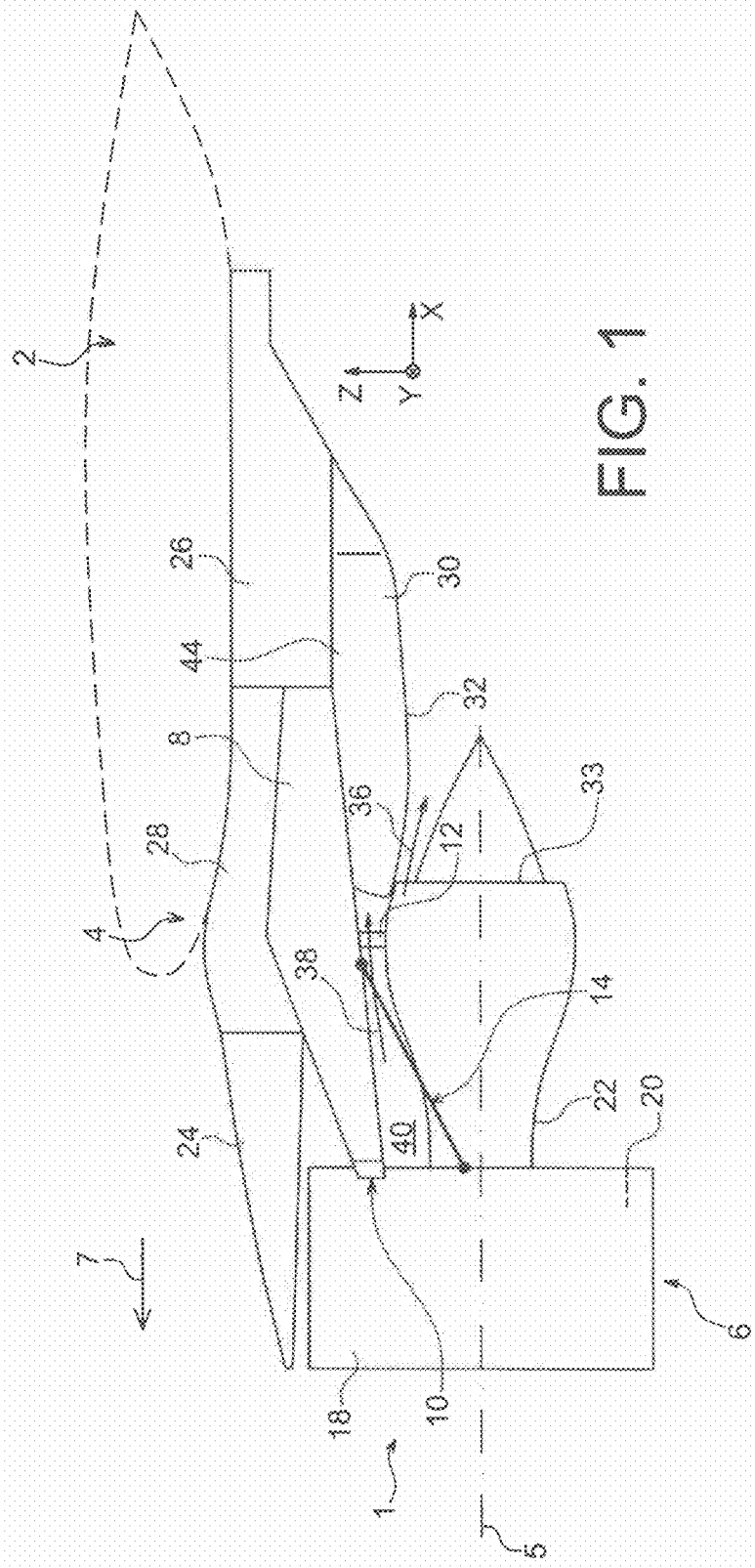

With reference to FIG. 1, an aircraft engine assembly 1 can be seen intended to be attached to a wing 2 of this aircraft, where this assembly 1 includes a mounting device 4 according to a preferred embodiment of the present invention, together with an engine 6, such as a turbojet, mounted under this device 4.

Globally, the mounting device 4 includes a rigid structure 8, also called primary structure, supporting means for mounting the engine 6, where these means for mounting have multiple engine attachments 10, 12, together with a device for transmission of the thrust forces 14 generated by the engine 6.

As an indication, it should be noted that the assembly 1 is intended to be surrounded by a nacelle (not represented), and that mounting device 4 includes another series of attachments (not represented) added on to this rigid structure 8 and enabling this assembly 1 to be suspended under the wing surface 2 of the aircraft.

In the remainder of the following description, by convention, X refers to the lengthways direction of the device 4 which is also comparable to the lengthways direction of turbojet 6 and to that of the lower aft aerodynamic fairing which will be presented below, and where this direction X is parallel to a lengthways axis 5 of this turbojet 6. Further, Y refers to the direction aligned transversely relative to the device 4 and also comparable to the transverse direction of turbojet 6 and to that of the lower aft aerodynamic fairing, and Z to the vertical direction or the height, and where these three directions X, Y and Z are mutually orthogonal.

In addition, the terms "front" and "aft" must be considered relative to the forward direction of the aircraft imparted due to the thrust exerted by the turbojet 6, and this direction is represented schematically by the arrow 7.

In FIG. 1 the two engine attachments 10, 12, the thrust forces transmission device 14, the rigid structure 8 of the mounting device 4, and multiple secondary structures added on to the rigid structure 8 are therefore depicted. These secondary structures segregating the systems and holding them in position, whilst supporting the elements of the aerodynamic fairing, will be described below.

As can be seen, turbojet 6 has at the front a large fan casing 18 demarcating an annular bypass duct 20, and includes towards the aft a smaller central casing 22, enclosing the core of this turbojet. Casings 18 and 22 are of course securely connected to one another.

As can be seen in FIG. 1, the device 4 has two engine attachments 10, 12, called respectively the front engine attachment and the aft engine attachment.

In this preferred embodiment of the present invention the rigid structure 8 takes the form of a box extending from the aft to the front, roughly in direction X.

The box 8 then takes the form of a pylon of a similar design to that habitually observed for turbojet mounting pylons, notably in the sense that it is fitted with transverse ribs (not represented), each taking the form of a rectangle aligned in a YZ plane.

The mounting means of this preferred embodiment firstly include the front engine attachment interposed between a front end of the rigid structure 8, also called a pyramid, and an upper part of the fan case 18. The front engine attachment 10 is designed in a traditional manner known to the skilled man in the art.

Secondly, the aft engine attachment 12, which is also produced in a traditional manner known to the skilled man in the art, is for its part interposed between the rigid structure 8 and the central casing 22.

Again with reference to FIG. 1, the secondary structures of the pylon 4 include a front aerodynamic structure 24, an aft aerodynamic structure 26, a fairing 28 connecting the front and aft aerodynamic structures, and a lower aft aerodynamic fairing 30.

Globally, these secondary structures are traditional structures identical or similar to those found in the prior art, and known to the skilled man in the art, except for the lower aft aerodynamic fairing 30, which will be described in detail below.

More specifically, the front aerodynamic structure 24 is positioned as a lower front extension of the wing surface 2 and above the primary structure 8. It is assembled securely on the rigid structure 8, and has an aerodynamic profile between an upper part of the fan access door assemblies connected to it, and the leading edge of the wing surface. This front aerodynamic structure 24 then has not only an aerodynamic fairing function, but also allows the positioning, segregation and routing of the various systems (air, electrics, hydraulics, fuel). In addition, since the front part of this structure 24 is not in contact with the rigid structure 8, it is habitually interposed between a thermal exchanger in the space defined between these two elements.

As a direct aft extension of this structure 24, again under the wing surface and assembled above the rigid structure 8, is the "connecting fairing" 28, also called the "karman". After this, again in the aft direction, the karman 28 is extended by the aft aerodynamic structure 26, which contains most of the hydraulic equipment. This structure 26 is preferably located fully to aft of the rigid structure 8, and is therefore attached under the wing surface of the aircraft.

Finally, under the rigid structure 8 and the aft aerodynamic structure 26 is the lower aft aerodynamic fairing 30, also called the "shield" or "Aft Pylon Fairing". Its essential functions are the formation of a thermal barrier, also called the anti-fire barrier, used to protect the pylon and the wing surface from the heat released by the primary flow, and the formation of an aerodynamic continuity between the engine outlet and the mounting pylon.

The abovementioned fairing 30 includes a thermal protection floor 32, or lower spar fitted with an outer surface intended to be followed by a primary flow of the engine which it partially and radially demarcates towards the outside, and where this primary flow escaping from the exhaust nozzle 33 of the engine is represented schematically by the arrow 36. In addition, the fairing 30 also includes two side panels 44 which, for their part, are designed to be followed externally by a secondary flow of the engine represented schematically by the arrow 38, due to their positioning in the annular bypass duct 40 of the engine's secondary flow, and/or at the outlet of the latter.

It should be noted that in the described preferred embodiment in which the engine 6 is intended to be suspended under the wing surface of the aircraft, the thermal protection floor 32 of the pylon and of the wing surface with regard to the primary flow 36 constitutes a lower portion of the fairing 30. Naturally, this floor would constitute an upper portion of the fairing in the alternative case in which the engine was intended to be installed above the wing surface.

Lastly, as can be seen in FIG. 1, it is intended that the front end of the floor 32 should follow the upper aft end of the exhaust nozzle 33, or again that it should be positioned very closely to this same aft nozzle end 33.

Figure 2:
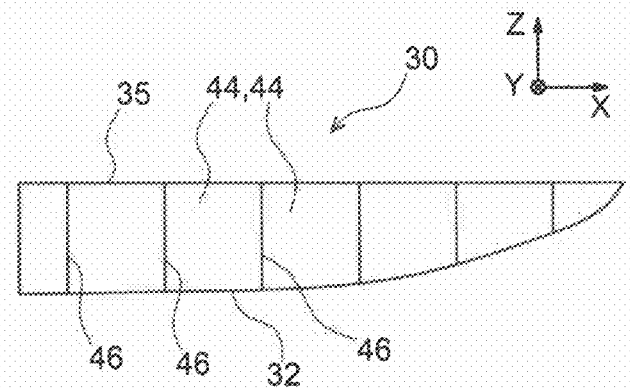
FIG. 2 represents a more detailed sideways schematic view of the lower aft aerodynamic fairing fitted to the mounting device shown in FIG. 1, where this fairing is also the subject of the present invention.
Figure 3:
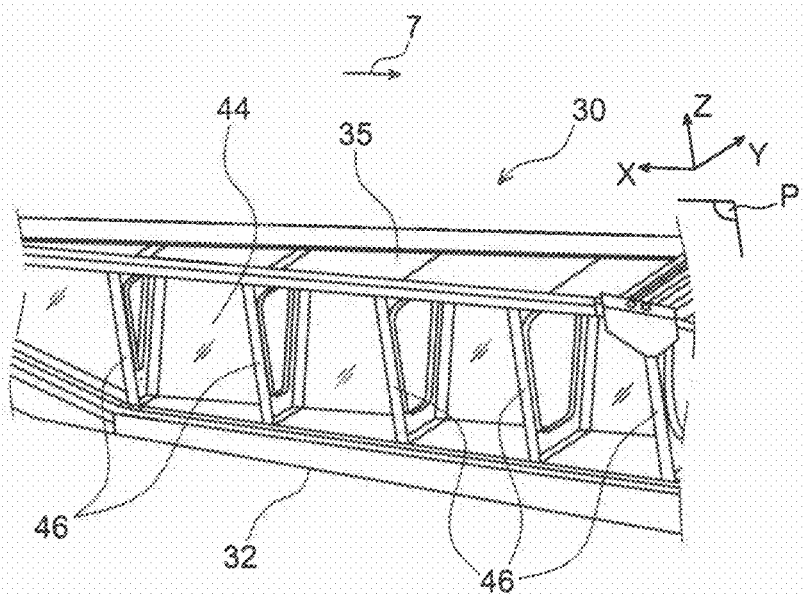
FIG. 3 represents a perspective view of a part of the lower aft aerodynamic fairing in FIG. 2.

With reference, at present, to FIGS. 2 and 3, the lower aft aerodynamic fairing 30 can be seen in greater detail, taking as it does the general shape of a box which is closed at the top by an upper spar 35, i.e. in the direction of the other structures of the pylon 4 on which it is intended to be assembled, namely the aft aerodynamic structure 26 and the rigid structure 8. The fairing 30 preferably has a plane of symmetry P corresponding to an XZ plane, where this plane P also constitutes a vertical plane of symmetry for the entire mounting device 4, and for the engine 6.

The lower aft aerodynamic fairing 30 in the shape of a box also includes the two side panels 44 (only one is visible in each of the FIGS. 2 and 3 for reasons of clarity), where each of these panels 44 is, substantially, aligned in a plane XZ, either side of plane P. They are mounted together by stiffening transverse internal ribs 46, spaced relative to one another in the direction X, where each of these ribs 46 is aligned in a plane YZ. These transversely aligned ribs 46 are also mounted on the upper 35 and lower 32 spars, thereby enabling all the external elements 32, 35, 44 forming the box to be held together.

Figure 4A:
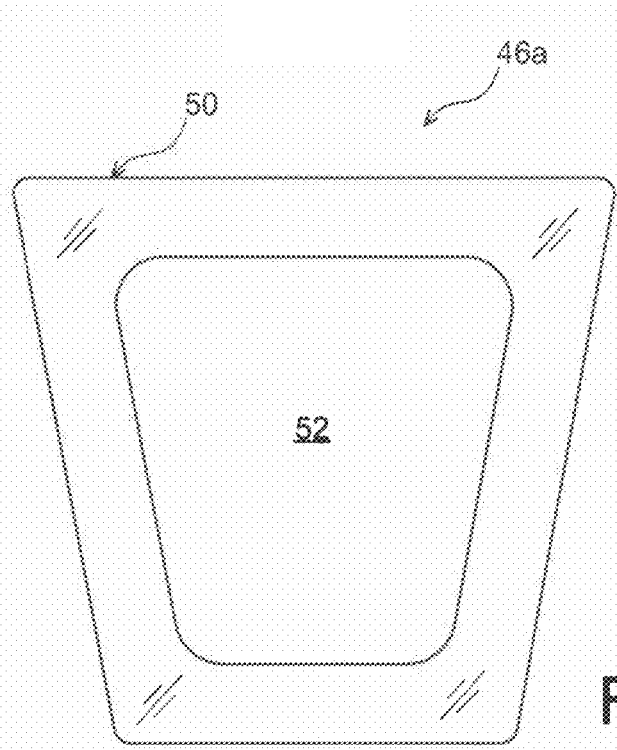
FIGS. 4a to 4d' represent various steps of a method of manufacture of an internal rib fitted to the fairing shown in FIGS. 2 and 3, where this method takes the form of a preferred embodiment of the present invention.
Figure 4B:
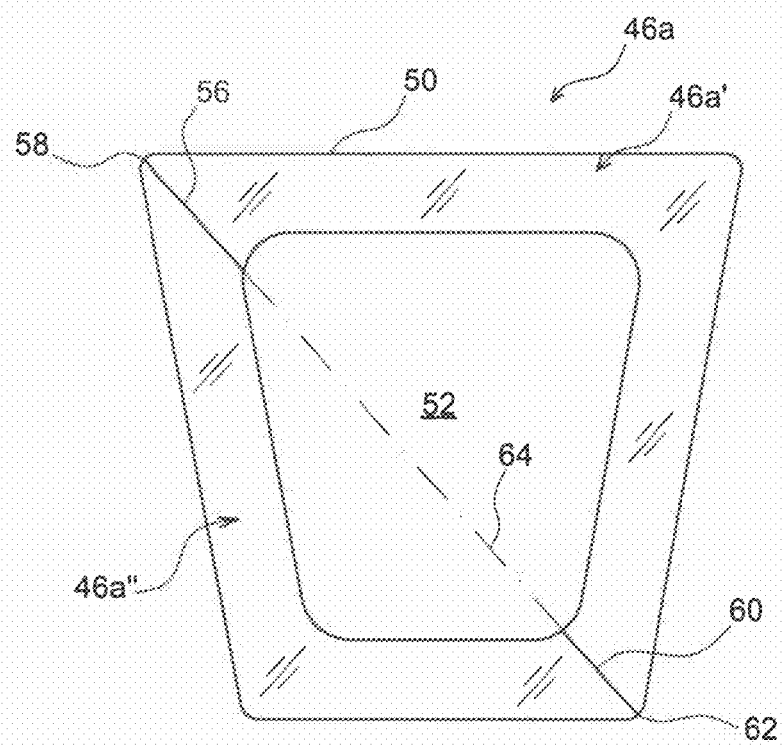
Figure 4B:
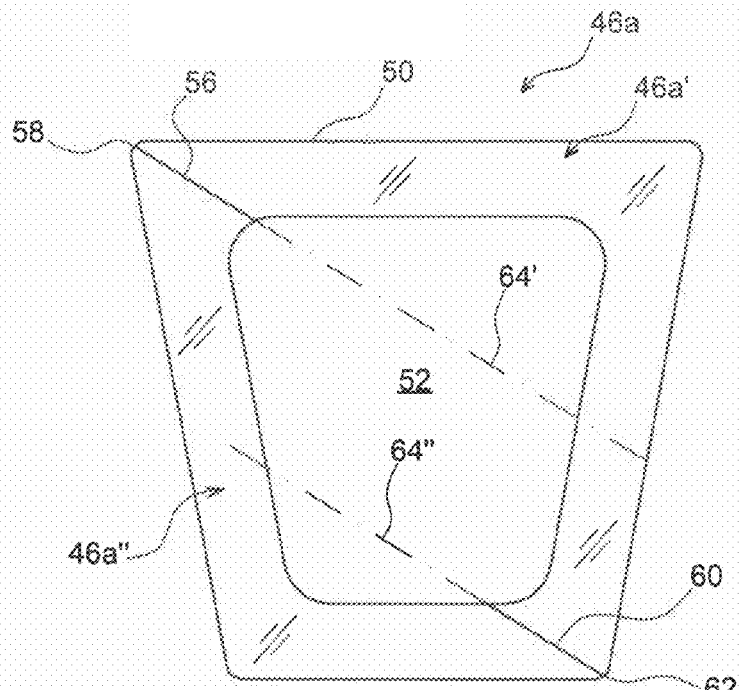
Figure 4C:
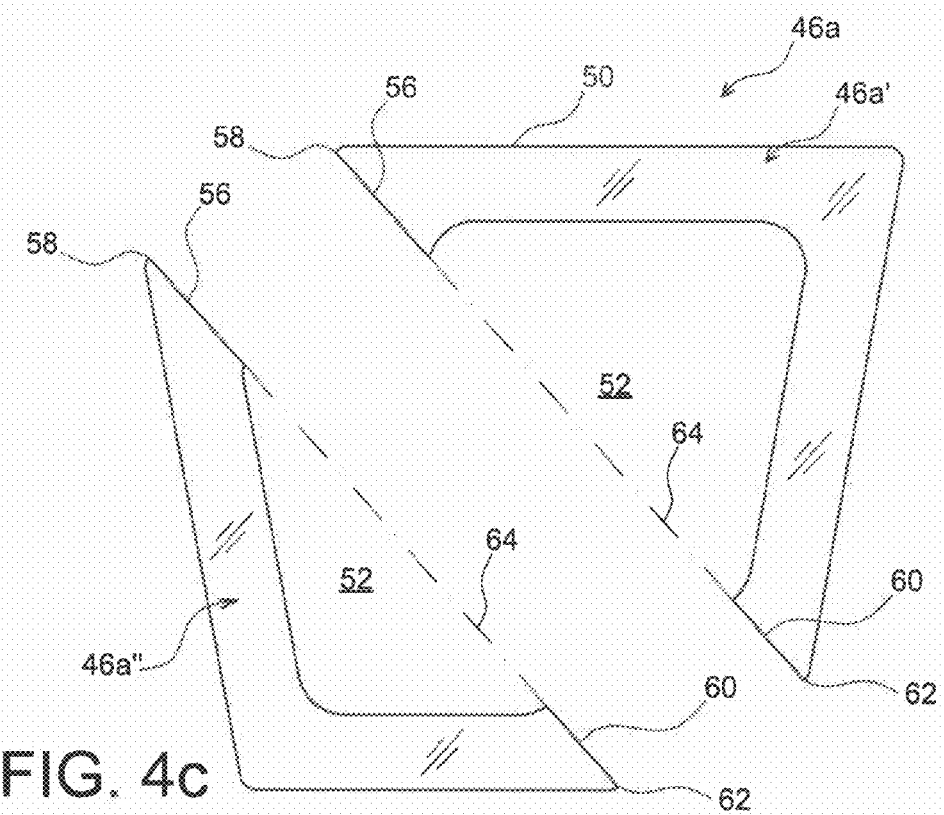
Figure 4D:
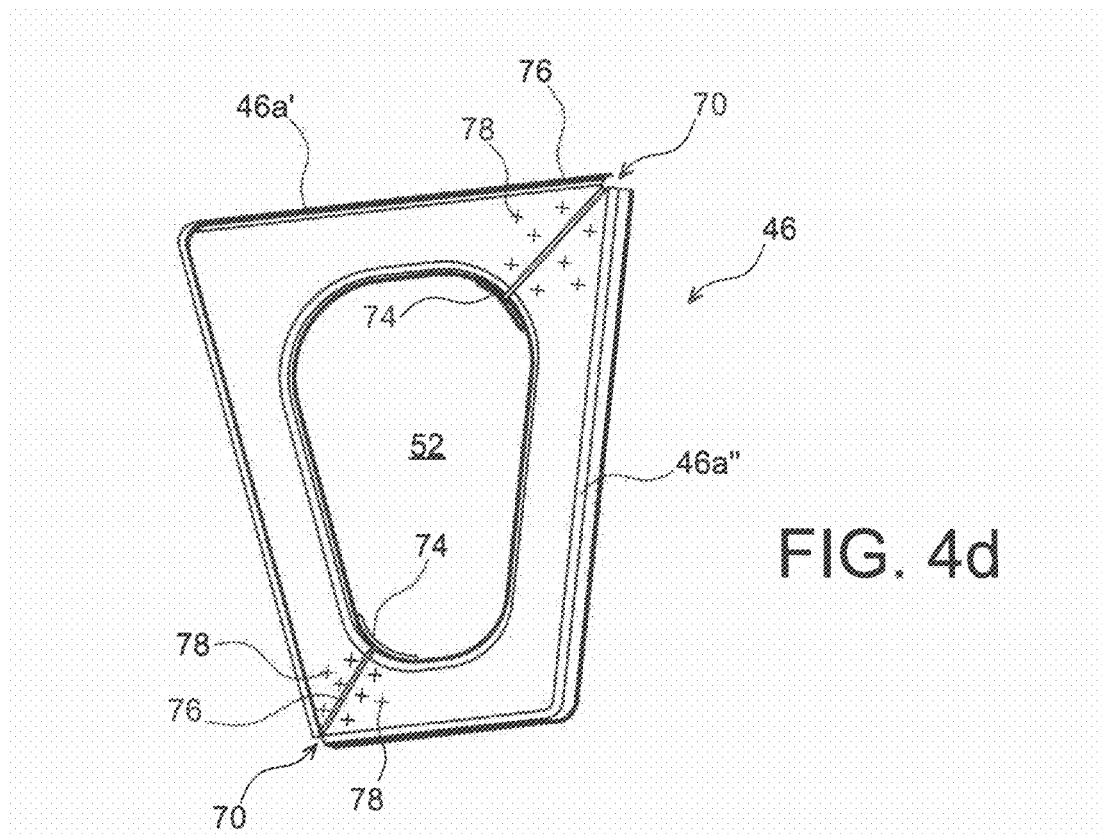
Figure 4D:
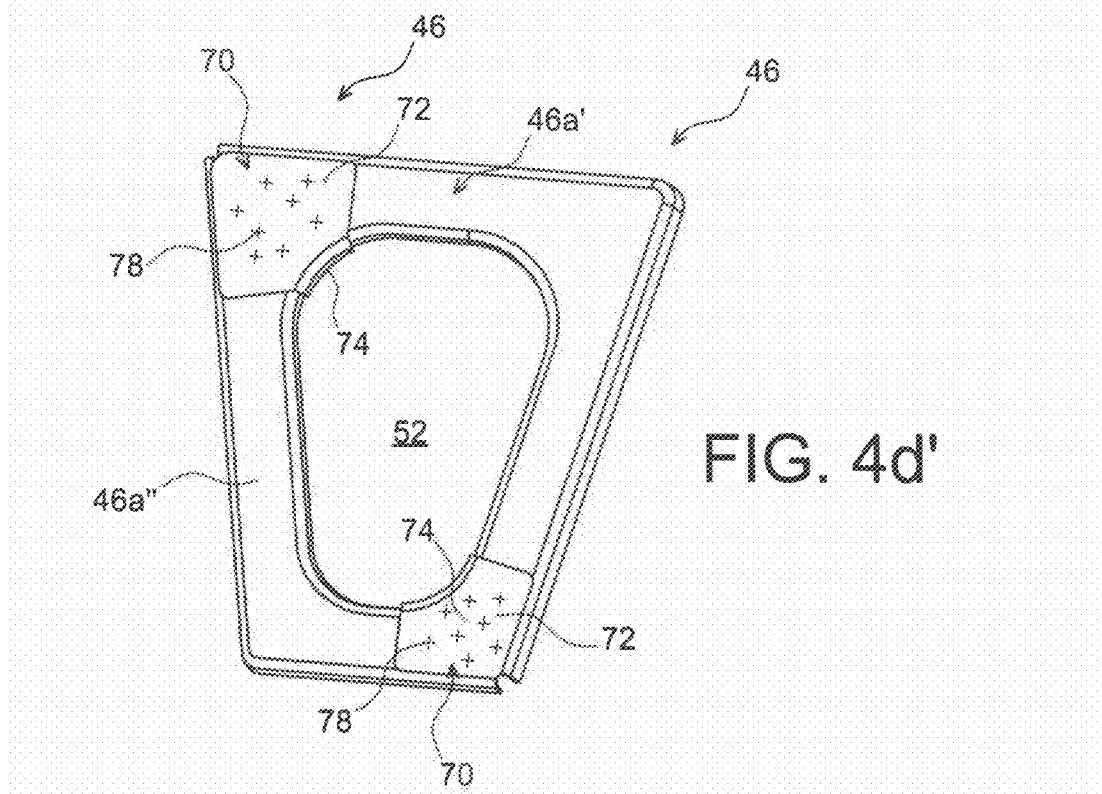

FIGS. 4d and 4d' represent one of these ribs 46, the method of manufacture of which will now be described. It is understood that the other stiffening internal ribs can be produced according to an identical or similar method. In both these figures, which represent a given rib 46, seen from two opposing faces, it can be seen that it adopts a roughly planar shape, for example of a thickness of a few millimetres, and preferably less than or equal to 2 mm. It has, globally, the shape of a trapezium perforated in its centre by an opening, with the large base located towards the top and the small base towards the bottom. The large base is thus intended to be connected to the upper spar of the fairing, the lower base is intended to be connected to the lower spar of the fairing, and both sides are respectively intended to be connected to the two side panels of this same fairing.

As an indication, the opening area occupies 40 to 60% of the total area of the rib traversed by this opening.

With reference firstly to FIG. 4a, the method of manufacture of the rib is begun by the production of a rib preform 46a, by superplastic forming, also called SPF ("Superplastic Forming"). This preform 46a has a geometry similar to that of the final rib represented in FIGS. 4d and 4d'. In particular, seen from the front as represented in FIG. 4a, preform 46a has an outline 50 in a broadly quadrilateral shape, and more specifically in the form of a trapezium. In addition, it has a central opening 52 fully traversing the preform 46a, which also has a broadly trapezoid shape, such that the preform 46a has the general shape of a frame following the outline of a trapezium.

The rib preform 46a is produced from a single piece of titanium alloy TAV6, which has appropriate characteristics for the implementation of the step of superplastic forming enabling it to be obtained, in a manner known to the skilled man in the art.

After this, the said rib preform 46a is divided in such a way as to split it into two rib half-parts 46a' and 46a". In FIG. 4b it can be seen that this division is undertaken in two diagonally opposite areas of the preform, since the first division is made according to a first straight-line segment 56 connecting a first corner 58 of the trapezium 50 to the opening 52, and that a second division is made according to a second straight-line segment 60 connecting a second corner 62 of the trapezium to the opening, where the second corner 62 is diagonally opposed to the abovementioned first corner 58.

In FIG. 4b both straight-line segments 56, 60 are supported by the same diagonal 64 of the trapezium. Another possibility consists in the option, shown in FIG. 4b', of having both segments 56, 60 parallel, but offset relative to one another, i.e. respectively supported by two separate parallel straight-line segments, referenced 64' and 64". In both cases, the adjustment of the relative positions of the preform half-parts 46a' and 46a", shown in FIG. 4c, enables precise dimensions to be obtained in both directions of the rib plane, i.e. in the direction of the height according to which both bases of the trapezium are separated, and in the direction of the width according to which both sides of this same trapezium are separated. Be that as it may, this repositioning of the two preform half-parts 46a' and 46a" enables tolerances to be obtained which are more accurate than those initially presented by the rib preform 46a.

In addition, when the two preform half-parts 46a' and 46a" have been repositioned relative to one another they are attached by means of bolted fishplates, in order to obtain the stiffening transverse internal rib represented in FIGS. 4d and 4d'.

To accomplish this, a fishplate 70 is included at both junctions between the two preform half-parts 46a' and 46a".

Each fishplate includes a blank 72 supported against one of the faces of the half-parts 46a', 46a", where this blank defines a corner superimposed on the trapezium corner recomposed by the assembly of the half-parts 46a', 46a". In addition, the blank 72 extends as far as the opening 52, having an edge 74 following the inside of the latter. In addition, a core 76 protrudes from the blank 72, in the direction of the face opposite the half-parts 46a', 46a", without extending beyond it. This core 76, also originating from the edge 74, presents two opposing surfaces, each facing the other, and possibly in contact with one of the divided edges of the half-parts 46a', 46a".

Each fishplate 70 is preferably made from a single piece, for example made of titanium alloy.

Finally, bolts 78 enable the blank 72 of the fishplates 72 to be secured on the ends of the half-parts 46a', 46a" which they connect.

Naturally, various modifications can be made by the skilled man in the art to the invention which has just been described, solely as non-restrictive examples. With this regard, it can be stated notably that if engine assembly 1 has been presented in an appropriate configuration for it to be suspended under the wing surface of the aircraft, this assembly 1 could also have been presented in a different configuration enabling it to be mounted above this same wing surface, or in an aft part of the fuselage.

The invention claimed is:

1. A lower aft aerodynamic fairing for a mounting device of an engine, in use, interposed between a wing surface of an aircraft and the engine, comprising:
   a box including two side panels connected to one another by a plurality of stiffening transverse internal ribs spaced relative to one another in a lengthways direction of the fairing, and
   a thermal protection floor having an outer surface following a primary contour of the engine,
   wherein at least a first rib of the stiffening transverse internal ribs includes a quadrilateral shape produced by superplastic forming, the first rib having two half-parts, and
   wherein the two half-parts each have a first straight-line segment and a second straight line segment diagonally opposed to one another, the two half-parts being joined together via at least one fishplate to form the first rib.

2. A mounting device of an engine interposed between an aircraft wing surface and the engine, the mounting device comprising the lower aft aerodynamic fairing according to claim 1.

3. An engine assembly including the engine and the mounting device according to claim 2.

4. An aircraft including the engine assembly according to claim 3.

5. The lower aft aerodynamic fairing, according to claim 1, wherein the first rib has a central opening traversing a front surface of the first rib.

6. The lower aft aerodynamic fairing, according to claim 5, wherein the central opening occupies 40 percent to 60 percent of the front surface of the first rib.

7. The lower aft aerodynamic fairing, according to claim 1, wherein the first straight-line segment and the second straight-line segment are part of a common diagonal of the quadrilateral.

8. The lower aft aerodynamic fairing, according to claim 1, wherein the first straight-line segment and the second straight-line segment are parallel to each other.

9. The lower aft aerodynamic fairing, according to claim 1, wherein the first rib is made from a titanium alloy, TAV6.

10. The lower aft aerodynamic fairing, according to claim 1, wherein the quadrilateral shape is trapezoidal.

11. The lower aft aerodynamic fairing, according to claim 1, wherein a thickness of the first rib is less than or equal to 2 mm.

12. The lower aft aerodynamic fairing, according to claim 1, wherein the at least one fishplate includes a blank, a core protruding from the blank, and an edge.

13. The lower aft aerodynamic fairing, according to claim 12, wherein the blank is supported against a front surface of the first rib, and
   wherein the core of the at least one fishplate extends along a face formed by at least one of the first straight-line segment and the second straight-line segment.

14. The lower aft aerodynamic fairing, according to claim 12, wherein the first rib has a central opening traversing a front surface of the first rib, and
   wherein the edge of the at least one fishplate follows an inside surface of the central opening.

15. The lower aft aerodynamic fairing, according to claim 1, wherein the at least one fishplate is attached to each of the two-half parts via bolts.

* * * * *